(No Model.) 2 Sheets—Sheet 1.
C. P. STEINMETZ.
SYSTEM OF ELECTRICAL DISTRIBUTION.
No. 533,247. Patented Jan. 29, 1895.
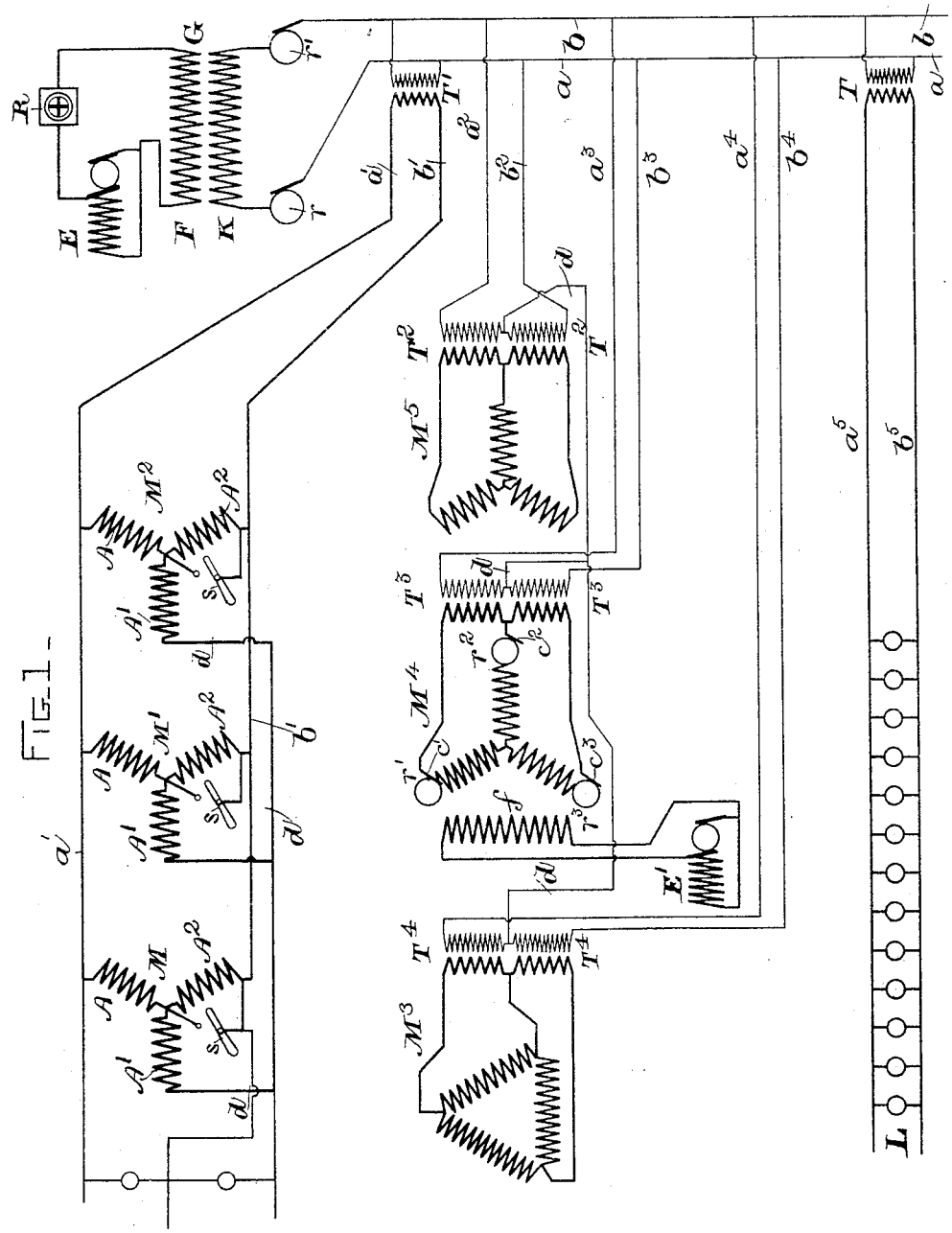
WITNESSES
Henry Westendarp.
T. J. Johnston.
INVENTOR
Charles P. Steinmetz by
Geo. R. Blodgett.
Atty.

(No Model.) 2 Sheets—Sheet 2.
C. P. STEINMETZ.
SYSTEM OF ELECTRICAL DISTRIBUTION.
No. 533,247. Patented Jan. 29, 1895.
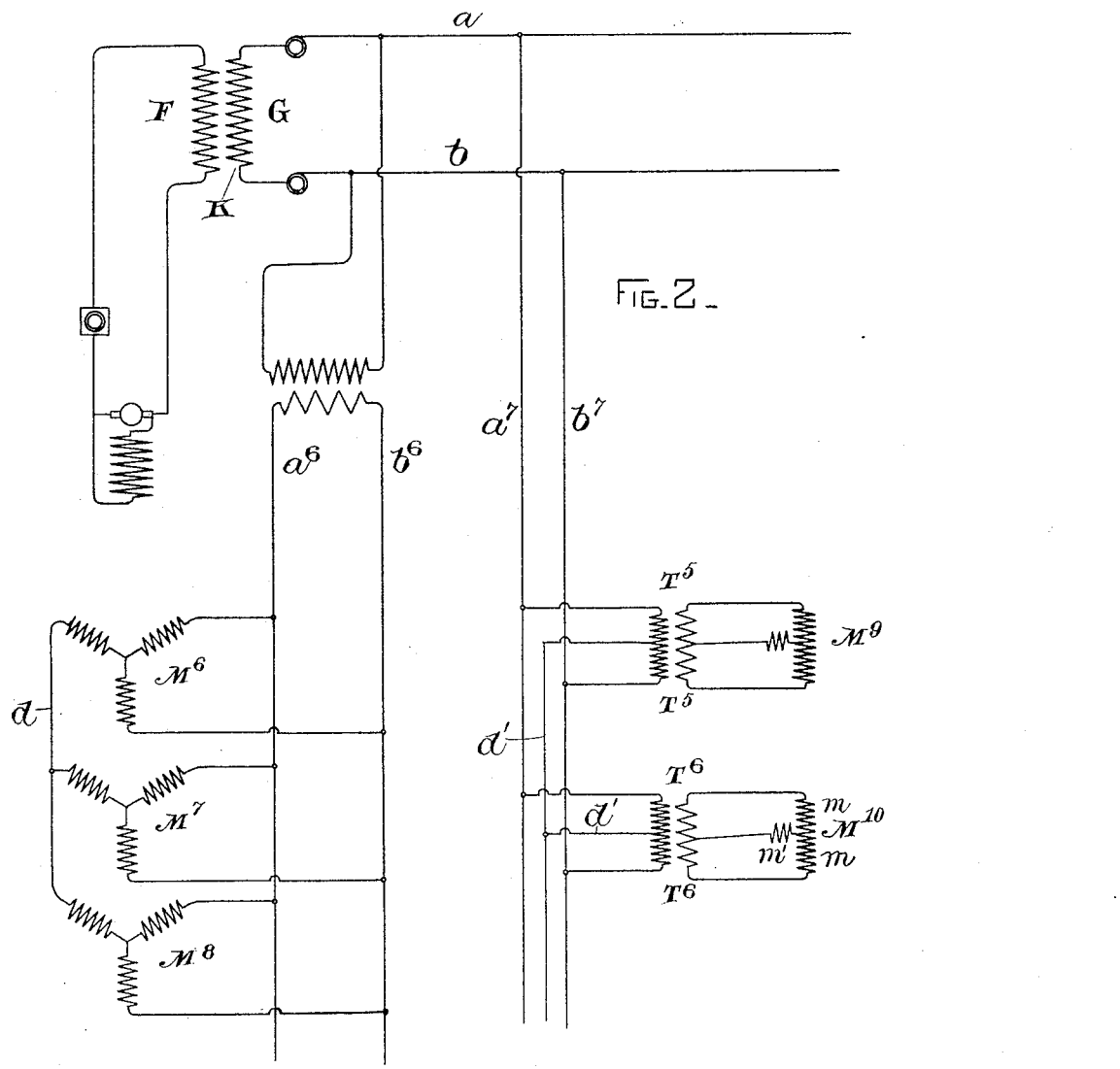

UNITED STATES PATENT OFFICE.

CHARLES P. STEINMETZ, OF SCHENECTADY, NEW YORK, ASSIGNOR TO THE THOMSON-HOUSTON ELECTRIC COMPANY, OF BOSTON, MASSACHUSETTS.

SYSTEM OF ELECTRICAL DISTRIBUTION.

SPECIFICATION forming part of Letters Patent No. 533,247, dated January 29, 1895.

Application filed September 24, 1894. Serial No. 523,919. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Systems of Electrical Distribution, of which the following is a specification.

This invention relates to improvements in systems of electrical distribution, and more especially to those systems in which the electrical energy is transmitted and distributed to distant points by means of alternating electric currents and there converted into mechanical energy by alternating current motors. The most efficient system for this purpose has heretofore been one in which the electrical energy is transmitted on three or more multiphase mains, which deliver multiphase currents to motors of the multiphase type. Such a system while of excellent efficiency has the disadvantage of requiring the use of more than two mains. On the other hand it is possible to run alternating motors of a certain type by a single phase current delivered from a single pair of mains, but in such a system the motors will in general not be self starting.

I have discovered that if two or more multiphase motors have some of their coils connected across a single phase circuit and other out of phase coils occupying a displaced position in the magnetic field, relatively to the first named, connected by a balance wire, the operation of any one of the motors will produce on this balance wire an out of phase electro motive force which will enable any one of the other motors to be started. When two or more of the motors are in operation they present the same flexibility and range of speed as in the case with the ordinary multiphase motor on multiphase mains.

In the accompanying drawings Figure 1 is a diagrammatic representation of a system of distribution embodying my invention, three-phase motors being shown. Fig. 2 shows a system in which motors with coils displaced ninety degrees are employed.

In Fig. 1, G represents a single phase alternating generator of which F indicates the field winding and K the armature winding. The field winding is shown as excited by a separate exciter E and has its exciting current controlled by rheostat R giving means for regulation. The armature winding K is connected through the commutator rings $r\ r'$ to single phase mains $a\ b$. From these mains $a\ b$ lead branches $a'\ b'$, $a^2\ b^2$, $a^3\ b^3$, &c. The potential on the alternating mains would in general be comparatively high so that transformers T, T', T², &c., are shown as included in the branch circuits, for the purpose of decreasing the potential on such branch circuits to a convenient amount.

In the upper one of the branch circuits $a'\ b'$, I have indicated three multiphase motors M, M', M², which are here shown as of the three phase induction type, with Y connected coils. Each of these motors has two of its coils connected in series across the single phase mains and the third coil of each motor is connected to the corresponding coil of the other motors by a balance wire $d$. If we suppose that all but one of the motors are disconnected from the supply lines $a'\ b'$ and the motor M, which is connected, to have been started and to be running, then there will be generated in the coil A', which is connected to the balance wire, an alternating electro motive force, out of phase with the electro motive forces on the single phase lines $a'\ b'$. This out of phase electro-motive force is communicated to the balance wire and if any other motor is then thrown into connection with the single phase lines $a'\ b'$ and the balance wire $d$ it will receive in its coil A' an out of phase electro motive force, which, co-operating with the electro-motive forces on the single phase lines $a'\ b'$ will serve to start the motor in operation. It will thus be seen that the operation of any one of the motors will generate on wire $d$ an out of phase electro motive force which enables any one of the other motors to be self starting. When all of the motors are in operation, the balance wire $d$ may be, and preferably is, practically idle, but in case of abnormally heavy or light load on part of the motors it will serve to transfer energy from the lightly loaded parts of the system to the overloaded parts. In case a motor is put in connection with the supply lines and no other motor has previously been so connected it may be started into operation in any convenient manner. I have shown for this purpose a small switch $s$, shunting one of the inducing coils of the motor, which, with the proper proportioning of the various parts will cause the motor to start, even when under load.

In another portion of the figure are shown three branch circuits $a^2 b^2$, $a^3 b^3$, $a^4 b^4$, which supply motors $M^5$, $M^4$, $M^3$, through sets of transformers $T^2 T^2$, $T^3 T^3$, $T^4 T^4$, which reduce the potential on the motors. The balance wire $d$ is connected to a point between the primary coils of each set of transformers $T^2 T^2$, $T^3 T^3$, $T^4 T^4$. The motor $M^5$ is shown as an induction motor with Y connection, and has two of its coils connected in series with the secondaries of the transformers $T^2 T^2$, its third coil being connected between the secondaries of transformers $T^2 T^2$. A synchronous motor $M^4$ is shown having armature coils relatively displaced and connected in Y connection. These coils are connected to collector rings $r'$, $r^2$, $r^3$, on which bear brushes $c' c^3$, connected to outer terminals of the secondaries of transformers $T^3 T^3$, and brush $c^2$ connected to the junction of said secondaries.

A field coil $f$ in circuit with a separate exciter $E'$, is provided for this synchronous motor. $M^3$ represents a three phase induction motor having a delta winding, one of its coils being connected in series with the secondaries of the transformers $T^4 T^4$ and the junction of the other two coils being connected to the junction of the secondaries of transformers $T^4 T^4$. The operation of these devices is the same as that above described except that transfer of the out of phase electro motive force and of energy on the balance wire $d$ is effected with an intermediate transformation by transformers $T^2 T^2$, $T^3 T^3$, $T^4 T^4$. This arrangement is applicable to cases wherein the motors are all in reasonable proximity to the mains $a$ $b$, but distant from one another, while the arrangement shown for the motors $M$, $M'$, $M^2$ is more especially applicable to the case of motors in proximity to one another. At $a^5 b^5$ I have shown a branch circuit containing translating devices such as lamps L, supplied through a transformer T, from the mains $a$ $b$. It is also clear that single phase translating devices whether inductive or non-inductive may be supplied from any one of the branch lines $a' b'$, $a^2 b^2$, &c.

The motors shown in Fig. 1, are all three phase motors, and it must be understood that ordinary three phase motors may be employed as here shown, without any modification whatever. Such motors in general, as heretofore constructed have their three coils similarly wound, so as to be equal in effect—so that the electro motive forces generated on the balance wire $d$ would naturally be balanced, in the normal operation of the motors; but this equality of action is not necessary. The coils may have unequal relative values in the different motors—so that this balance does not exist. The balanced system however, is preferred. For this purpose however, it is not necessary that the relation between the coils of each motor should be one of equality. It is only necessary that this relation should be the same in the several motors—that is, if one of the coils is stronger in effect than the other coils, in one of the motors, the corresponding coil in the other motors should be stronger than the other coils in the said motors. It will also be clear that any other phase relation may be used, and the same system may carry three phase apparatus in one part and quarter phase in another part, the balance wires being separate, that is, the three phase apparatus having one balance wire, and the quarter phase apparatus another balance wire, or such apparatus of different phase relation may even be connected to the same balance wire, by the interposition of appropriate phase changing apparatus, such as transformers. Thus in Fig. 2 I have shown a system comprising mains $a$ $b$, supplied with single phase current by a generator G having field winding F and armature winding K, and supplying three phase translating devices, such as three phase motors $M^6$, $M^7$, $M^8$, in one part of the system, and in another part supplying motors $M^9$, $M^{10}$, $M^{11}$—which may be supposed to be quarter phase or to have any other desired phase relation.

Transformers are used to reduce the potential on the translating devices as before, and the description of motors $M$, $M'$, $M^2$ given above applies equally to motors $M^6$, $M^7$, $M^8$, in branch circuit $a^6 b^6$, as their operation is quite independent of that of the rest of the circuit.

The motors $M^9$, $M^{10}$ in sub-circuit $a^7 b^7$ have main coils $m$, supplied by the single phase lines, and supplementary coils $m'$, angularly displaced with reference to the main coils and connected at one end to an intermediate part of said coils. The other ends of the supplementary coils are inter-connected by the balance wire $d'$. These connections are effected through transformers $T^5 T^5$, $T^6 T^6$ as with motors $M^3 M^4$ and transformers $T^4 T^4$, $T^3 T^3$, in Fig. 1. The motors $M^9$, $M^{10}$, when running, generate out of phase counter electro motive forces between the balance wire $d'$ and the sub-mains $a^7 b^7$. The difference of phase between the electro motive forces developed, depends on the relative effects of the main coils $m$ and the supplementary coils $m'$. The relative effects of the coils may be such as to make this difference ninety degrees or one hundred and twenty degrees of phasal angle or any other phasal relation. The motors $M^9$ $M^{10}$ in any case would be alike in phase relation and would interact, through the balance wire, as above explained for motors $M^3 M^4$.

What I claim as new, and desire to secure by Letters Patent of the United States, is—

1. The combination of two or more alternating current motors or other motive apparatus having a portion of their coils connected with a source of alternating current for supplying power to the motors, and their remaining coils so located as to generate an out-of-phase electromotive force, and a balance wire connecting the last named out-of-phase coils, for the purpose set forth.

2. In a system of electrical distribution the combination of single phase mains, a single phase alternating current generator supplying said mains, two or more translating devices connected to said mains, each having a portion in which an electro motive force is generated, out of phase with the electro motive forces on the mains; and a balance wire connected to such out of phase portions in the different devices, but not connected to the generator.

3. In a system of electrical distribution the combination of a generator of alternating single phase currents, single phase mains connected to said generator and two or more translating devices each connected to the single phase mains and each generating when in normal operation, an electro motive force out of phase with the electro motive forces on the mains, and a balance wire connected to each of the translating devices and supplied thereby with such out of phase electro motive force.

4. In a system of electrical distribution the combination of a single phase alternating generator, single phase mains connected to said generator, two or more multiphase motors connected to said mains, each motor having a portion wherein an electro motive force is generated out of phase with the electro motive forces on the mains, and a balance wire connected to such out of phase portions in the several motors but not connected to the generator.

5. In a system of electrical distribution the combination of a generator of alternating single phase currents, single phase mains connected to said generator, two or more alternating multiphase motors having a portion of their coils connected to the single phase mains, and a balance wire connecting points of the multiphase motors at which an out of phase electro motive force is generated by the normal operation of the motors.

In witness whereof I have hereunto set my hand this 19th day of September, 1894.

CHARLES P. STEINMETZ.

Witnesses:
B. B. HULL,
J. LE D. LANGDON.